(12) United States Patent  (10) Patent No.: US 7,633,553 B2
Lundblad et al.  (45) Date of Patent: *Dec. 15, 2009

(54) EPG-CONDITIONED LETTERBOX-TO-ANAMORPHIC CONVERSION

(75) Inventors: James Lundblad, Mountain View, CA (US); Andrew Wayne Walters, San Jose, CA (US); J. Wiltse Carpenter, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 918 days.

This patent is subject to a terminal disclaimer.

(21) Appl. No.: 10/972,163

(22) Filed: Oct. 22, 2004

(65) Prior Publication Data

US 2005/0066359 A1 Mar. 24, 2005

Related U.S. Application Data

(63) Continuation of application No. 10/039,224, filed on Jan. 4, 2002, now Pat. No. 6,965,415.

(51) Int. Cl.
*H04N 5/46* (2006.01)

(52) U.S. Cl. .......................................... 348/556; 725/39

(58) Field of Classification Search ................. 348/556, 348/555, 554, 558, 445, 474, 468, 569; 725/39, 725/40

See application file for complete search history.

(56) References Cited

U.S. PATENT DOCUMENTS

| 3,997,772 | A | | 12/1976 | Crochiere et al. |
| 5,402,187 | A | | 3/1995 | Ezaki |
| 6,166,778 | A | * | 12/2000 | Yamamoto et al. .......... 348/569 |
| 6,317,171 | B1 | | 11/2001 | Dewald |
| 6,594,825 | B1 | | 7/2003 | Goldschmidt Iki et al. |
| 6,965,224 | B1 | * | 11/2005 | Hey ........................ 324/76.53 |
| 6,965,415 | B2 | | 11/2005 | Lundblad et al. |
| 2005/0066359 | A1 | | 3/2005 | Lundblad et al. |

* cited by examiner

*Primary Examiner*—M. Lee
(74) *Attorney, Agent, or Firm*—Lee & Hayes, PLLC

(57) ABSTRACT

Designed for use with widescreen TVs or high-end TVs with a mode for accommodating anamorphic programs, an EPG client is equipped with an electronic program guide (EPG) and a letterbox-to-anamorphic converter. The EPG client evaluates EPG data to determine whether programs are in the letterbox format. When a letterboxed program is selected for viewing, the EPG client vertically stretches the program by a ratio of M/N, where M>N (e.g., 4/3), to convert the program from the letterbox format to an anamorphic format prior to delivery to the television. The converted anamorphic program is output to the television, where it is horizontally expanded to fit the screen.

43 Claims, 5 Drawing Sheets

EPG-CONDITIONED LETTERBOX-TO-ANAMORPHIC CONVERSION

RELATED APPLICATION(S)

This is a continuation of U.S. patent application Ser. No. 10/039,224, which was filed on Jan. 4, 2002, and which issued as U.S. Pat. No. 6,965,415, on Nov. 15, 2005.

TECHNICAL FIELD

This invention relates to TV-based clients that execute electronic program guides, such as set-top boxes and hard-disk TV recorders.

BACKGROUND

Some programs are broadcast in a "letterbox" or "widescreen" format. This format converts a program (e.g., motion picture movie) that has been engineered for the big screen to fit on a conventional television display. Conventional TVs have an aspect ratio of 4:3 (measured as a ratio of width to height). The letterbox format shrinks the program width to fit on the TV screen.

Unfortunately, when you shrink the width, the height is also compacted or else the image is distorted. Shrinking the program vertically leaves gaps at the top and bottom of the screen, which are simply filled in with black. When played, movies in letterbox format use a limited number of lines on the TV, leaving black bands at the top and bottom of the TV screen. These black bands are familiar to viewers who have watched a VHS or DVD movie that has not been reformatted for the TV. The thickness of the bands depends on the width of the movie. Most movies today are 1.85 times as wide as tall, or a ratio of 1.85:1. Some movies are wider at a ratio of 2.35:1, such as the motion picture movie Star Wars.

Newer widescreen television sets are designed with an aspect ratio of 16:9. Widescreen television sets are designed to stretch the picture 33% horizontally and 33% vertically, enlarging the total picture by 78%. As a result, widescreen TVs are able to expand letterboxed movies to better utilize the screen area. Some movies released on DVD (digital video disk or digital versatile disk) are mastered in an "anamorphic" format where the program is pre-stretched vertically by a ratio of 4/3 (four-thirds). Anamorphic DVDs use 33% more of the storage area for the image, by stretching the image vertically by 33% and thereby increasing the number of lines. When anamorphic DVDs are played on widescreen TVs, the TVs operate in a mode that expands the program 33% in the horizontal direction, without vertical expansion since the vertical stretch is inherent in the anamorphic format. As a result, the program fits the whole screen, eliminating the black banding on the top and bottom of the screen. When anamorphic DVDs are played on standard 4:3 ratio TVs, the DVD players are designed to squeeze the image back down to normal. They use weighted averages to combine lines, scaling the image back down by 33%.

SUMMARY

Designed for use with widescreen TVs or high-end TVs with a mode for accommodating anamorphic programs, an EPG client is equipped with an electronic program guide (EPG) and a letterbox-to-anamorphic converter. The EPG client evaluates EPG data to determine whether programs are in the letterbox format. When a letterboxed program is selected for viewing, the EPG client vertically stretches the program by a ratio of M/N, where M>N (e.g., 4/3), to convert the program from the letterbox format to an anamorphic format prior to delivery to the television. The converted anamorphic program is output to the television, where it is horizontally expanded to fit the screen.

DETAILED DESCRIPTION

The following discussion is directed to television-based clients that are configured to run electronic program guides (EPG). Television or EPG clients can be implemented in many ways, including as a set-top box, a cable or satellite receiver, a TV recorder (e.g., Ultimate TV recorder from Microsoft Corp.), TV-enabled computer, and so forth. Such clients may be employed in different entertainment systems, such as interactive TV networks, cable networks, satellite networks, and Web-enabled TV networks. EPG clients range from full-resource clients with substantial memory and processing resources (e.g., TV recorders equipped with hard-disks) to low-resource clients with limited memory and/or processing resources (e.g., traditional set-top boxes). While aspects of the systems and methods described below can be used in any of these systems and for any types of clients, they are described in the context of the following exemplary operating environment.

Exemplary Environment

Figure 1:
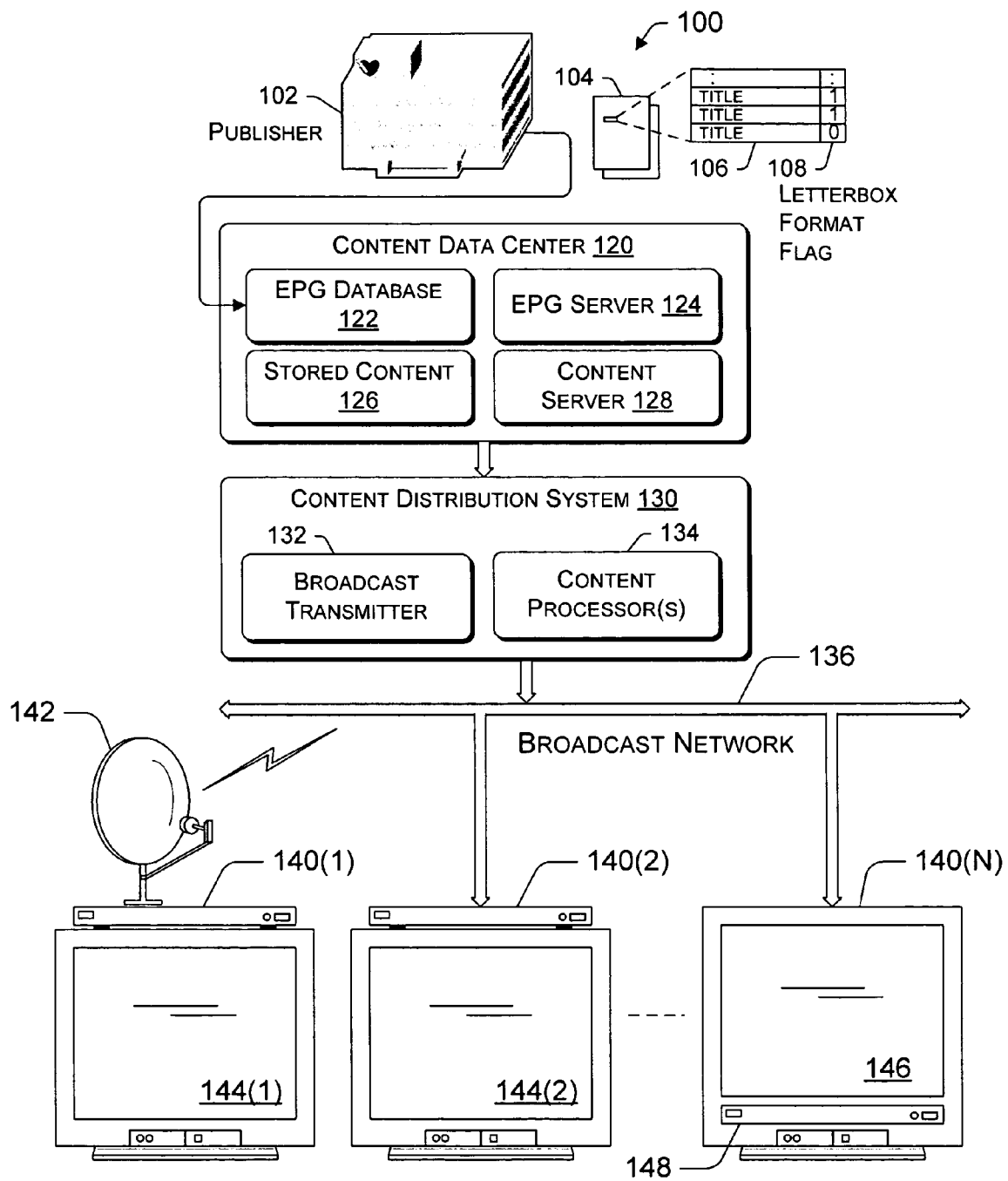
FIG. 1 illustrates an exemplary environment for a client device that interfaces a television with a television network.

FIG. 1 illustrates an exemplary environment 100 in which the methods and systems described herein may be implemented. The illustrated environment is a television entertainment system that facilitates distribution of program data to multiple viewers. The environment 100 includes a publisher 102 that creates the program data. One example of a publisher 102 is the Tribune Corporation, which generates data for use in an electronic program guide (EPG). Program data includes program titles, ratings, characters, description, actor names, year made, station identifiers, channel identifiers, schedule information, and so on. The terms "program data" and "EPG data" are used interchangeably throughout this discussion.

The EPG data is represented as an electronic file 104. The EPG data includes a title field 106 that holds program titles and an associated letterbox format field 108 that stores data indicating whether corresponding programs are formatted in a letterbox (or widescreen) format. It is noted that the association between the program title and format is merely illustrative of one possible implementation for associating a program with its format information. In other implementations, the format field may be associated with information other than the title, such as a program identifier or the like, or there may be other techniques for marking a letterboxed program.

The EPG data file 104 is transferred from the publisher 102 to one or more content data centers 120. As one example, the program data 104 is transferred using a file transfer protocol (FTP) over a TCP/IP network (e.g., Internet, UNIX, etc.) to the data center 120. The electronic file 104 is stored in an EPG database 122 at the data center 120.

The published version of the EPG data in file 104 contains programming information for all channels for one or more days. An EPG server 124 resides at the data center 120 to process the EPG data prior to distribution. The processing may involve any number of techniques to reduce, modify, or enhance the EPG data. Such processes might include selection of content, content compression, format modification, and the like.

The data center 120 further includes stored content 126 (e.g., movies, shows, commercials, music, etc.) and a content server 128. Content server 128 controls movement of the stored content and EPG data from the data center 120 to a content distribution system 130. Additionally, the content server 128 controls movement of live content (e.g., content that was not previously stored, such as live feeds) and/or content stored at other locations to the content distribution system.

The content distribution system 130 contains a broadcast transmitter 132 and one or more content processors 134. Broadcast transmitter 132 broadcasts signals (e.g., cable television signals) across a broadcast network 136, such as a cable television network, RF, microwave, satellite, a data network (e.g., Internet), and so on. Broadcast network 136 may include wired or wireless media using any broadcast format or broadcast protocol. Content processor 134 processes the content received from data center 120 prior to transmitting the content across the broadcast network 136. A particular content processor may encode or otherwise process the received content into a format that is understood by multiple client devices 140(1), 140(2), . . . , 140(N) coupled to the broadcast network 136. Although FIG. 1 shows a single data center 120 and a single content distribution system 130, the environment may include any number of data centers coupled to any number of content distribution systems.

The content distribution system 130 is representative of a headend service that provides EPG data, as well as content, to multiple subscribers. Each content distribution system 130 may receive a slightly different version of the program data that takes into account different programming preferences and lineups. The EPG server 124 creates different versions of EPG data that are limited to those channels of relevance to respective headend services. The content distribution system 130 transmits the EPG data to multiple client devices 140(1), 140(2), . . . , 140(N). In one implementation, for example, the distribution system 130 employs a carousel file system to repeatedly broadcast the EPG data over an out-of-band (OOB) channel to the clients 140.

The client devices 140 may be implemented in a number of ways. For example, a client device 140(1) receives broadcast content from a satellite-based transmitter via a satellite dish 142. The client device 140(1) is also referred to as a set-top box or a satellite receiving device. Client device 140(1) is coupled to a television 144(1) for presenting the content received by the client device. A particular client device 140 may be coupled to any number of televisions 144. Similarly, any number of client devices 140 may be coupled to a television 108.

Another client device 140(2) is coupled to receive broadcast content from broadcast network 136 and provide the received content to associated television 144(2).

Another client device 140(N) is a combination of a television 146 and an integrated set-top box 148. In this example, the various components and functionality of the set-top box are incorporated into the television, rather than using two separate devices. The set-top box incorporated into the television may receive broadcast signals via a satellite dish (similar to satellite dish 142) and/or via broadcast network 136. In alternate implementations, client devices 140 may receive broadcast signals via the Internet or any other broadcast medium.

Each client 140 runs an electronic program guide (EPG) that utilizes the program data. An EPG enables TV viewers to navigate through an onscreen program guide and locate shows. With the guides, viewers can look at schedules of current and future programming, set reminders for upcoming programs, or enter instructions to record one or more shows. Some programs, such as big screen movies, are broadcast in the letterbox format, preserving the aspect ratio of the theatrical presentation of the film.

The televisions 144 are representative of widescreen 16:9 aspect ratio TVs or high-end 4:3 aspect ratio TVs that are capable of expanding the letterbox format to better utilize the screen area. The client device 140 examines the program data, and namely the letterbox format flag in the format field 108, to identify whether a program is in the letterbox format. If it is, the client device 140 examines the user's settings to determine whether the television is letterbox compatible. Assuming such a television, when a viewer elects to view a program marked in the EPG as presented in the letterbox format, the client device 140 performs a vertical stretch on the displayed video frames/fields with a ratio of 4/3 to place it in an anamorphic format. This conversion expands the letterbox format vertically, producing approximately 33% more active lines. When output, the TV expands the anamorphic program horizontally to produce a visually appealing presentation without black bands (unless the program has an aspect ratio greater than 16:9).

Exemplary Client

Figure 2:
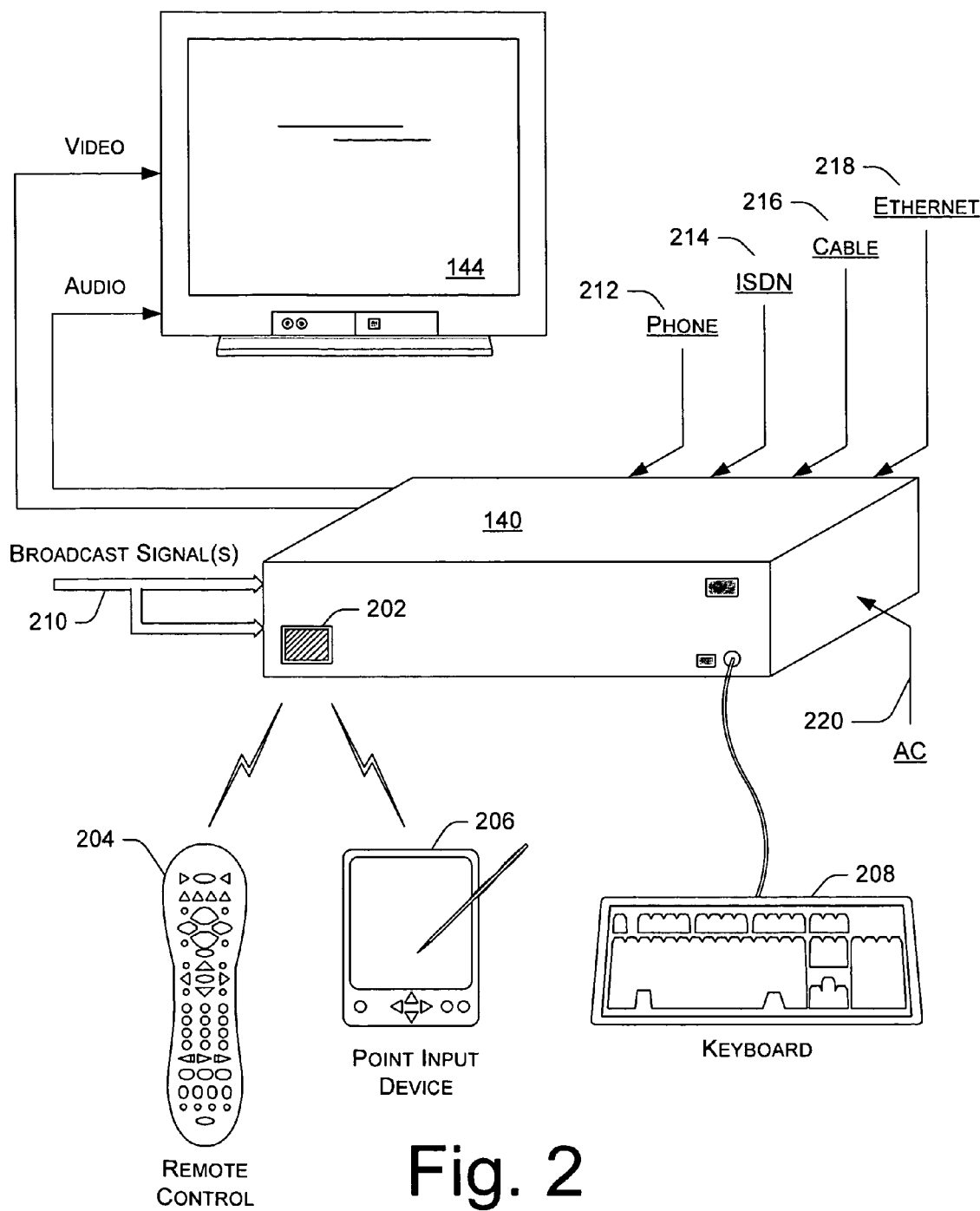
FIG. 2 is a diagrammatic view of an exemplary client device coupled to a television.

FIG. 2 illustrates an exemplary implementation of a client device 140. It is shown as a standalone unit that connects to TV 144. The client device may be implemented in any number of embodiments, including as a set-top box, a satellite receiver, a TV recorder with hard disk, a game console, and so forth. Client device 140 includes a wireless receiving port 202 (e.g., an infrared (IR) wireless port) for receiving wireless communications from a remote control device 204, a handheld 11 device 206 (such as a personal digital assistant (PDA), handheld computer, or wireless phone), or other wireless device, such as a wireless keyboard. Additionally, a wired keyboard 208 is coupled to communicate with the client device 140.

Client device 140 receives one or more broadcast signals 210 from one or more broadcast sources (e.g., from a broadcast network or via satellite). Client device 140 is capable of communicating with other devices via one or more connections including a conventional telephone link 212, an ISDN link 214, a cable link 216, and an Ethernet link 218. The client device 140 may use any one or more of the various communication links 212-218 at a particular instant. Client device 140 receives AC power on line 220.

Client device 140 generates a video signal and an audio signal, both of which are communicated to television 144. Although not shown, the client device 140 may include one or more lights or other indicators identifying the current status of the client device. Additionally, it may include one or more control buttons or switches (not shown) for controlling operation of the client device.

Figure 3:
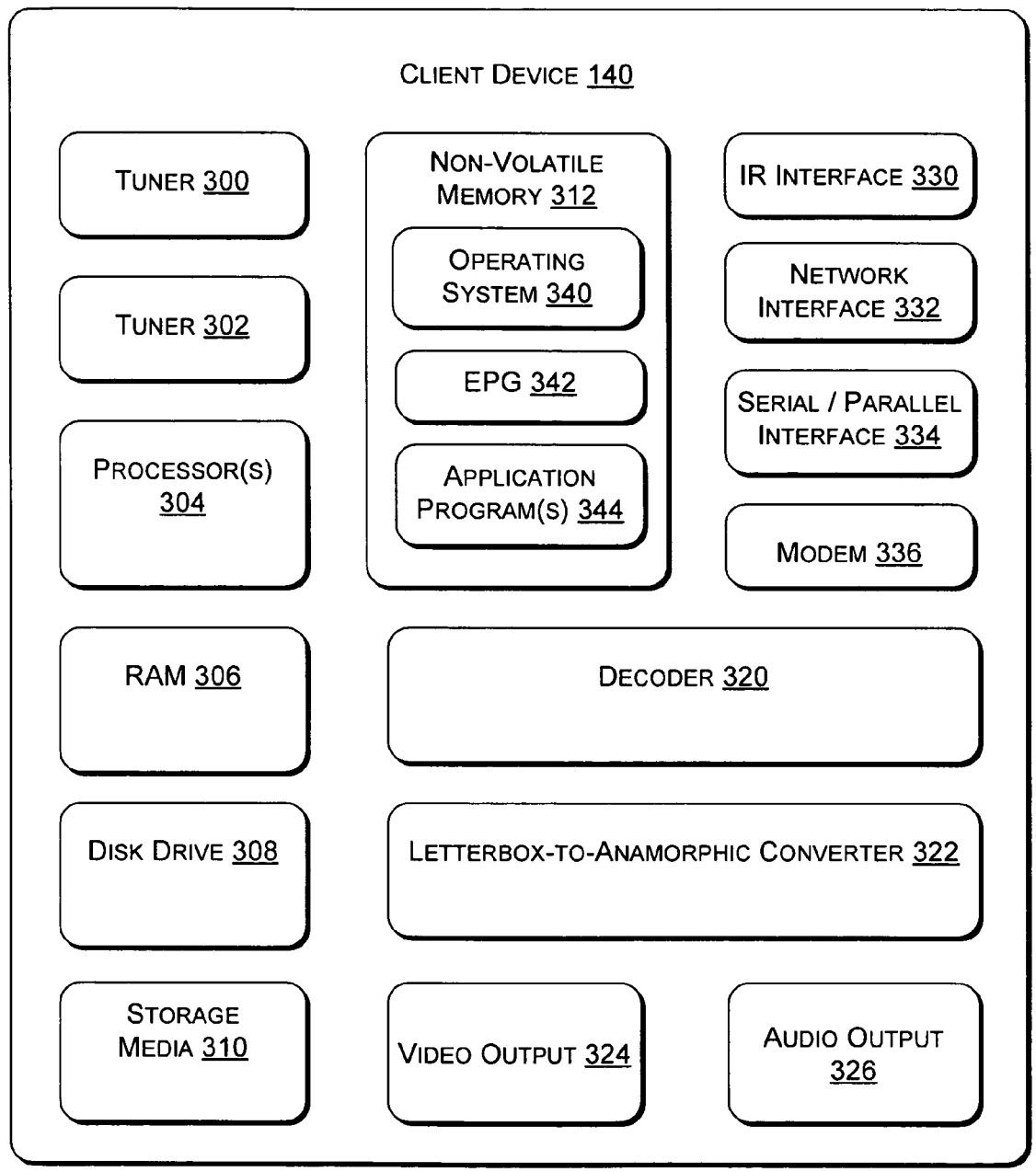
FIG. 3 is a block diagram of the exemplary client device.

FIG. 3 illustrates various components of the client device 140. It includes one or more tuners, such as tuners 300 and 302. The tuners 300 and 302 are representative of one or more in-band tuners that tune to various frequencies or channels to receive television signals, as well as an out-of-band tuner that tunes to the broadcast channel over which the EPG data is broadcast.

The client device 140 has one or more processors 304 and one or more memory components. Examples of possible memory components include random access memory (RAM) 306, disk drive 308, mass storage component 310, and non-volatile memory 312 (e.g., ROM, Flash, EPROM, EEPROM, etc.). Alternative implementations of the client device offer a range of processing and memory capabilities, and may include more or fewer types of memory components than those illustrated in FIG. 3. For example, full-resource clients are equipped with substantial memory and processing resources, including the disk drive 308 to store content for replay by the viewer. Low-resource clients, on the other hand, have limited processing and memory capabilities. Such low-resource clients may have a limited amount of RAM 306, no disk drive 308, and limited 19 processing capabilities.

The client device further includes a decoder 320 to decode a broadcast video signal, such as an NTSC, PAL, SECAM or other TV system video signal. A letterbox-to-anamorphic converter 322 is also provided to convert letterboxed programs from letterbox format to anamorphic format. This conversion is accomplished by vertically expanding the program by a ratio of M/N, where M>N (e.g., 4/3). Converted or unconverted program data is output to the television as a video output 324 and an audio output 326. The client device 140 may further include an IR interface 330, a network interface 332, a serial and/or parallel interface 334, and a modem 336. Although shown separately, some of the components may be implemented in an application specific integrated circuit (ASIC). Additionally, a system bus (not shown) typically connects the various components within client device.

An operating system 340 and one or more programs may be stored in non-volatile memory 312 and executed on the processor 304 to provide a runtime environment. A runtime environment facilitates extensibility of client device 140 by allowing various interfaces to be defined that, in turn, allow application programs to interact with client device 140. In the illustrated example, an EPG program 342 is stored in memory 312 to operate on the EPG data. Other programs 344 that may be implemented at the client device include a browser to browse the Web, an email program to facilitate electronic mail, and so one. The client 140 may further include other components, which are not shown for simplicity purposes. For instance, the client is typically equipped with a user interface (e.g., lights, buttons, display, etc.) to facilitate viewer interaction.

Letterbox-to-Anamorphic Conversion

Figure 4:
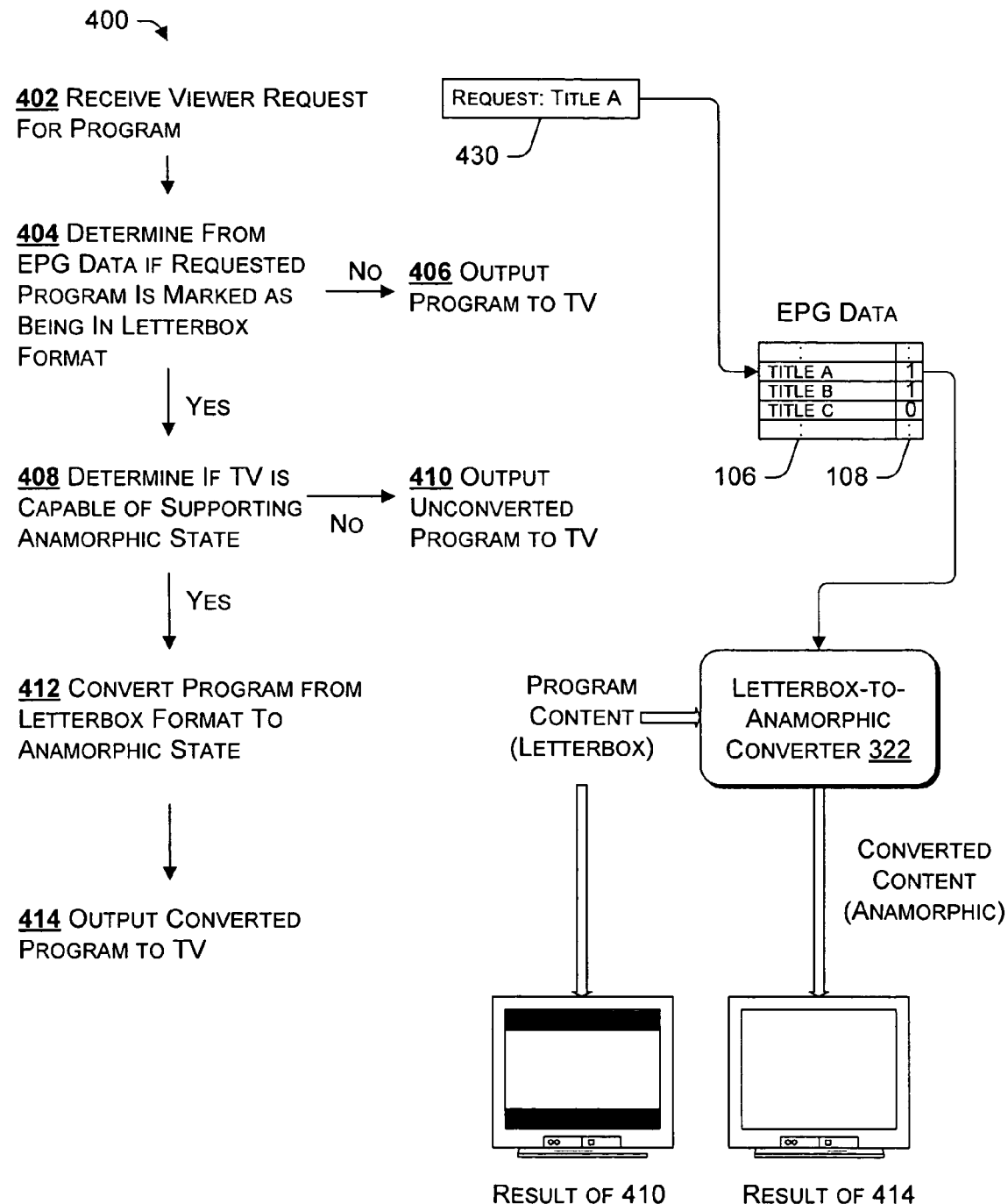
FIG. 4 illustrates an exemplary letterbox-to-anamorphic conversion process.

FIG. 4 shows one example of a conversion process 400 in which programs identified as being transmitted in letterbox format are converted to anamorphic programs prior to output to the television. The conversion process 400 may be implemented in software, firmware, hardware, or a combination of these. The process is described as a set of enumerated operations with additional reference to a diagrammatic illustration depicting exemplary components that might be used to perform the operations.

At 402, the client device receives a request 430 from a viewer to view a particular program. This request 430 may be generated in a number of ways, including changing to a particular channel, selecting a program from an EPG, and so forth. The request includes information to identify the program, such as the title, channel number, an alphanumeric identifier, etc.

At 404, the client device determines from the EPG data whether the requested program is marked as being in letterbox format. The program information is used to index into the EPG data and locate the letterbox format field 108. If the flag in the field is set (e.g., a binary "1"), the program is formatted in the letterbox format. Conversely, if the flag in the field 108 is reset (e.g., a binary "0"), the program is not formatted in the letterbox format.

If the program is not in letterbox format (i.e., the "no" branch from 404), the program content is output to the television without conversion (operation 406). This represents the case of normal programs that fit standard 4:3 aspect ratio TVs.

If the program is in letterbox format (i.e., the "yes" branch from 404), the client device 140 determines whether the TV is capable of supporting anamorphic programs. This determination may be made, for example, by examining the user's settings to ascertain whether the TV is letterbox capable. Alternatively, the client device may be able to query the TV for this information.

If the TV does not have an anamorphic mode or is otherwise not capable of supporting anamorphic programs (i.e., the "no" branch from 408), the program content is output to the television without conversion (operation 410). When presented, the unconverted program is displayed on the TV with black bands at the top and bottom of the screen, as depicted by left hand television above the caption "Result of 410".

Conversely, if the TV has an anamorphic mode or is otherwise capable of supporting anamorphic programs (i.e., the "yes" branch from 408), the client device converts the program content from letterbox format to anamorphic format using the letterbox-to-anamorphic converter 322 (operation 412). The letterbox-to-anamorphic converter 322 performs a vertical stretch on the video frames/fields with a ratio of M/N (where M>N) to place the program in an anamorphic format.

At 414, the converted content is output to the TV, where the image is again stretched 33% horizontally to fill the screen. The final display is visually 11 appealing and the black bands are eliminated, as depicted by the right hand television above the caption "Result of 414".

The letterbox-to-anamorphic converter 322 may be configured in a number of ways. In one implementation, the converter 322 employs resampling techniques to expand the image in the vertical direction by a factor of M/N (where M>N). More specifically, the converter uses polyphase filters to perform anamorphic resampling in the vertical direction.

Figure 5:
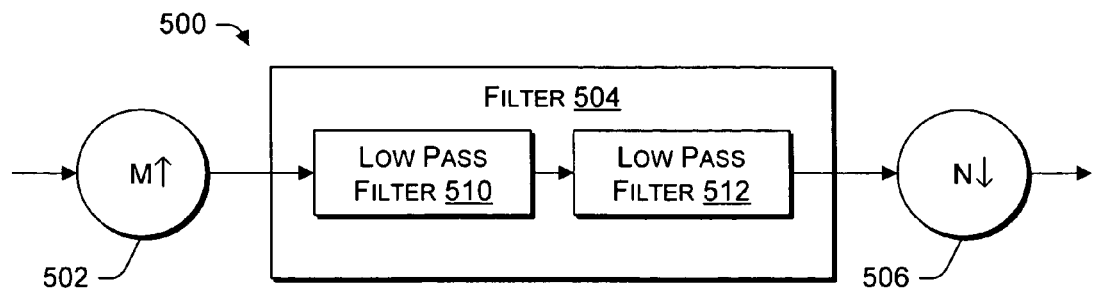
FIG. 5 is a block diagram of an ideal resampler that may be used in the letterbox-to-anamorphic conversion process.

FIG. 5 generally shows the resampling process performed by an ideal resampler 500. The resampler scales an image by a rational factor M/N, such as 4/3. The resampler 500 has a factor-of-M interpolator 502 that inserts (M−1) zeros between input samples to produce M times as many output samples. After this up-sampling, the samples are passed through a low pass filter 504 and out to a factor-of-N decimator 506 that retains every $N^{th}$ sample and discards all others. Following this down-sampling, the overall result of the resampler 500 is to produce M/N times as many output samples as there are input samples.

The low pass filter 504 may be thought of as comprising two ideal low pass filters: a first low pass filter with a cutoff of $\pi/M$ that smoothes the interpolated input samples and a second low pass filter with a cutoff of $\pi/N$ that performs anti-aliasing before decimation. The two low pass filters can be combined into a single low pass filter with a cutoff of the minimum of $\pi/M$ and $\pi/N$. As one implementation, a single FIR (finite impulse response) filter with L taps can be used to perform the resampling.

Figure 6:
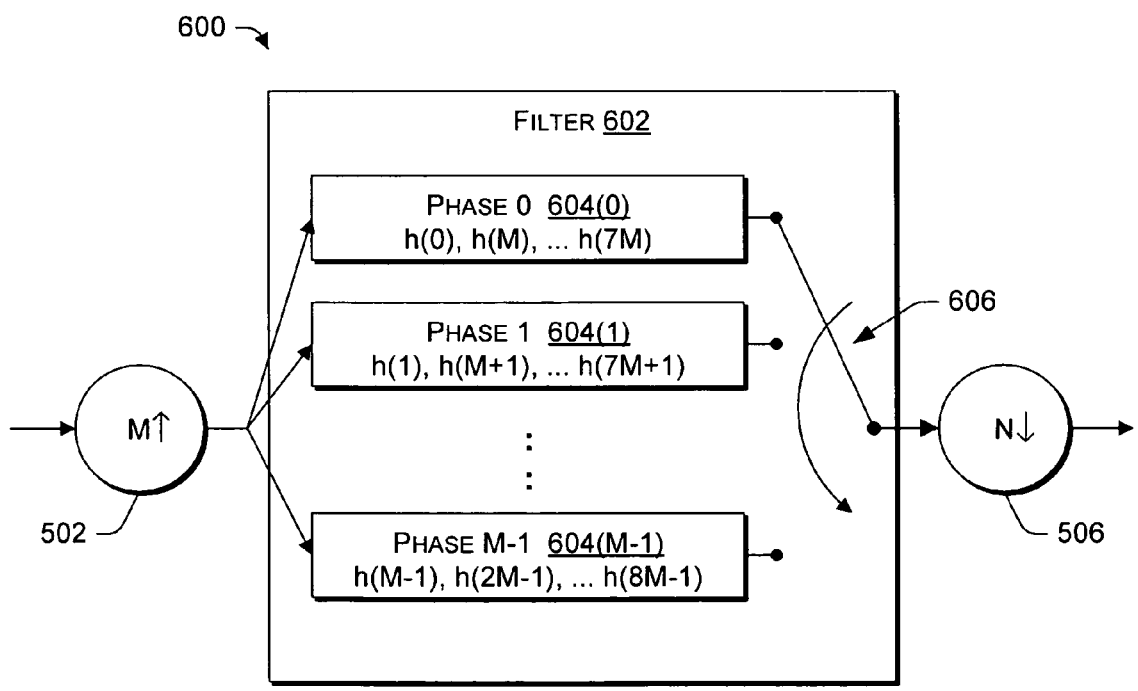
FIG. 6 is a block diagram of an exemplary polyphase resampler that may be used in the letterbox-to-anamorphic conversion process.

FIG. 6 shows an exemplary implementation of a polyphase resampler 600 that has similar functionality to the resampler 500 of FIG. 5. In the polyphase implementation, an L-tap low pass filter 602 is broken into M polyphase filters 604(0), 604(1), . . . , 604(M-1). In this implementation, each filter contains eight taps, or L=8M. After up-sampling at the interpolator 502, the samples are input to M filters 604. Each filter is designed so that any given phase's filter produces a shift of 1/M input samples relative to the previous phase's filter. A switch 606 selects the output from each phase in order. The result is a sequence of samples that is M times as long as the input sequence. This sequence goes through the decimator 506, which keeps every $N^{th}$ sample. The final output sequence is M/N times as long as the original input sequence.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer readable media comprising computer-executable instructions that, when executed on a computer, perform a method comprising:
   determining, from program data for an electronic program guide, whether a program is in letterbox format; and
   upon request for a program determined as being in letterbox format, converting the program to anamorphic format prior to outputting the program to a television.

2. A method as recited in claim 1, wherein the determining comprises evaluating a format flag associated with the program.

3. A method as recited in claim 1, wherein the converting comprises vertically stretching the program by a ratio of 4/3.

4. A method as recited in claim 1, wherein the converting comprises vertically stretching the program by a ratio of M/N, where M>N.

5. A method as recited in claim 1, wherein the converting comprises using multiple polyphase filters to resample the program.

6. A method as recited in claim 1, further comprising receiving the program data as part of a broadcast feed.

7. One or more computer readable media comprising computer-executable instructions that, when executed on a client device, perform a method for operating the client device that interfaces a television with a television network, comprising:
   ascertaining whether a program is in letterbox format;
   determining whether the television is capable of supporting anamorphic programs; and
   in an event that the program is in letterbox format and the television is capable of supporting anamorphic programs, converting the program from the letterbox format to anamorphic format prior to output to the television.

8. A method as recited in claim 7, wherein the ascertaining comprises checking a format field in program data to identify whether the program is marked as being in letterbox format.

9. A method as recited in claim 7, wherein the determining comprises discerning from user settings whether the television is capable of supporting anamorphic programs.

10. A method as recited in claim 7, wherein the converting comprises vertically stretching the program by a ratio of 4/3.

11. A method as recited in claim 7, wherein the converting comprises vertically stretching the program by a ratio of M/N, where M>N.

12. A method as recited in claim 7, wherein the converting comprises using multiple polyphase filters to resample the program.

13. A method as recited in claim 7, further comprising receiving the program data as part of a broadcast feed.

14. A computer-readable medium comprising computer-executable instructions that, when executed by a computer, direct a client device to:
   evaluate electronic program guide (EPG) data to discern whether a program is in letterbox format; and
   in an event that the program is in letterbox format, convert the program from the letterbox format to anamorphic format prior to outputting the program to a television.

15. A computer-readable medium as recited in claim 14, further comprising computer-executable instructions that, when executed by a computer, direct a client device to vertically stretch the program by a ratio of 4/3.

16. A computer-readable medium as recited in claim 14, further comprising computer-executable instructions that, when executed by a computer, direct a client device to vertically stretch the program by a ratio of M/N, where M>N.

17. A computer-readable medium comprising computer-executable instructions that, when executed by a computer, direct a client device to:
   ascertain whether a program is in letterbox format;
   determine whether the television is capable of supporting anamorphic programs; and
   in an event that the program is in letterbox format and the television is capable of supporting anamorphic programs, convert the program from the letterbox format to anamorphic format prior to outputting the program to a television.

18. A computer-readable medium as recited in claim 17, further comprising computer-executable instructions that, when executed by a computer, direct a client device to check a format field in program data to identify whether the program is marked as being in letterbox format.

19. A computer-readable medium as recited in claim 17, further comprising computer-executable instructions that, when executed by a computer, direct a client device to ascertain from user settings whether the television is capable of supporting anamorphic programs.

20. A computer-readable medium as recited in claim 17, further comprising computer-executable instructions that, when executed by a computer, direct a client device to vertically stretch the program by a ratio of 4/3.

21. A computer-readable medium as recited in claim 17, further comprising computer-executable instructions that, when executed by a computer, direct a client device to vertically stretch the program by a ratio of M/N, where M>N.

22. A client device, comprising:
   a memory;
   a processor coupled to the memory;
   an electronic program guide (EPG) stored in the memory and executed on the processor to organize and present program data relating to programs, the program data including information identifying whether programs are in letterbox format; and
   a letterbox-to-anamorphic converter to convert a program identified by the EPG to be in letterbox format into an anamorphic program in anamorphic format for output to a television display.

23. A client device as recited in claim 22, wherein the letterbox-to-anamorphic converter is configured to vertically stretch the program by a ratio of 4/3.

24. A client device as recited in claim 22, wherein the letterbox-to-anamorphic converter is configured to vertically stretch the program by a ratio of M/N, where M>N.

25. A client device as recited in claim 22, wherein the letterbox-to-anamorphic converter comprises a resampler to produce M/N times as many output samples from input samples, where M>N.

26. A client device as recited in claim 22, wherein the letterbox-to-anamorphic converter comprises a polyphase resampler with multiple polyphase filters.

27. A client device as recited in claim 22, wherein the letterbox-to-anamorphic converter comprises:
- a factor-of-M interpolator to produce M times more samples than were input to the converter;
- a low pass filter to filter the samples; and
- a factor-of-N decimator to reduce the number of samples by a factor of N, thereby producing M/N times as many output samples as were input to the converter.

28. A client device as recited in claim 27, wherein the low pass filter comprises multiple polyphase filters.

29. A client device, comprising:
- a memory;
- a processor coupled to the memory, the processor being configured to identify whether a program is in letterbox format and to determine whether a television is capable of supporting an anamorphic format; and
- a letterbox-to-anamorphic converter to convert a program identified to be in letterbox format into an anamorphic program in anamorphic format for output to a television display in an event that the television is capable of supporting anamorphic programs.

30. A client device as recited in claim 29, wherein the letterbox-to-anamorphic converter is configured to vertically stretch the program by a ratio of 4/3.

31. A client device as recited in claim 29, wherein the letterbox-to-anamorphic converter is configured to vertically stretch the program by a ratio of M/N, where M>N.

32. A client device as recited in claim 29, wherein the letterbox-to-anamorphic converter comprises a resampler to produce M/N times as many output samples from input samples, where M>N.

33. A client device as recited in claim 29, wherein the letterbox-to-anamorphic converter comprises a polyphase resampler with multiple polyphase filters.

34. A client device as recited in claim 29, wherein the letterbox-to-anamorphic converter comprises:
- a factor-of-M interpolator to produce M times more samples than were input to the converter;
- a low pass filter to filter the samples; and
- a factor-of-N decimator to reduce the number of samples by a factor of N, thereby producing M/N times as many output samples as were input to the converter.

35. A client device as recited in claim 34, wherein the low pass filter comprises multiple polyphase filters.

36. A system for use with a television capable of supporting anamorphic programs, comprising:
- program guide means for examining electronic program guide data to ascertain whether a program is in letterbox format; and
- in an event that the program is in letterbox format, conversion means for converting the program from the letterbox format to anamorphic format prior to output to the television.

37. A system as recited in claim 36, wherein the conversion means comprises means for vertically stretching the program by a ratio of 4/3.

38. A system as recited in claim 36, wherein the conversion means comprises means for vertically stretching the program by a ratio of M/N, where M>N.

39. A system as recited in claim 36, wherein the conversion means comprises resampling means for resampling the program to produce M/N times more output samples than input samples, where M>N.

40. A system, comprising:
- means for ascertaining whether a program is in letterbox format; and
- means for determining whether the television is capable of supporting anamorphic programs; and
- in an event that the program is in letterbox format and the television is capable of supporting anamorphic programs, conversion means for converting the program from the letterbox format to anamorphic format prior to output to the television.

41. A system as recited in claim 40, wherein the conversion means comprises means for vertically stretching the program by a ratio of 4/3.

42. A system as recited in claim 40, wherein the conversion means comprises means for vertically stretching the program by a ratio of M/N, where M>N.

43. A system as recited in claim 40, wherein the conversion means comprises resampling means for resampling the program to produce M/N times more output samples than input samples, where M>N.

\* \* \* \* \*